No. 683,504. Patented Oct. 1, 1901.
F. SCHNEIDER.
CENTRIFUGAL LUBRICATOR.
(Application filed Dec. 8, 1900.)
(No Model.)

UNITED STATES PATENT OFFICE.

FRANZ SCHNEIDER, OF HÖCHST-ON-THE-MAIN, GERMANY.

CENTRIFUGAL LUBRICATOR.

SPECIFICATION forming part of Letters Patent No. 683,504, dated October 1, 1901.

Application filed December 8, 1900. Serial No. 39,216. (No model.)

*To all whom it may concern:*

Be it known that I, FRANZ SCHNEIDER, merchant, a subject of the Emperor of Germany, and a resident of Höchst-on-the-Main, in the Empire of Germany, have invented certain new and useful Improvements in Centrifugal Lubricators, of which the following is a specification.

My invention relates to a lubricator to be applied to a rotating mechanical element and in which the centrifugal force acting upon the body of the lubricant will cause the latter to be fed to the bearing of the rotating element while the latter is in motion.

My invention will be fully understood upon reference to the accompanying drawings, in which—

Figure 1:
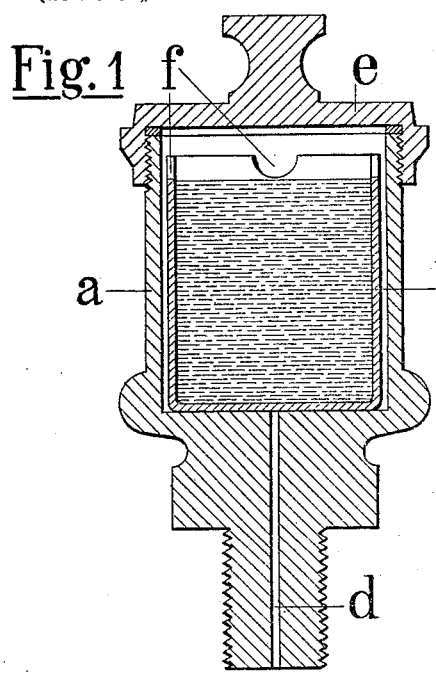
Figure 2:
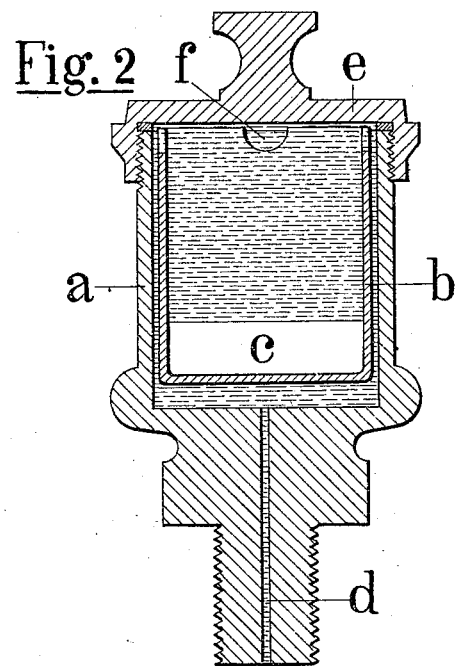
Figure 3:
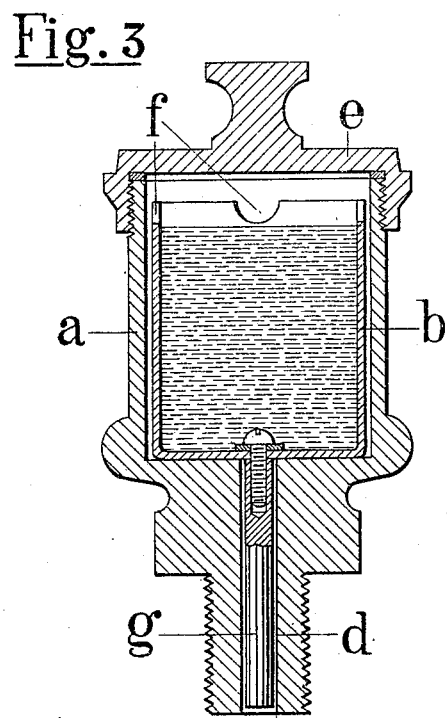
Figure 4:
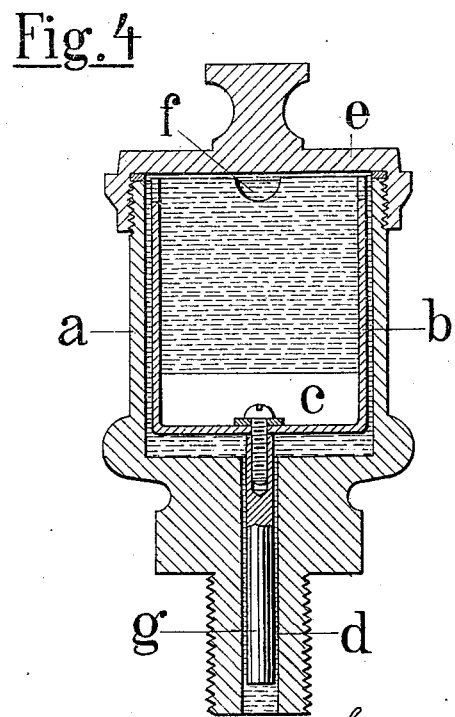

Figures 1 and 2 and 3 and 4 represent in axial section two embodiments of my improved lubricator, Figs. 2 and 4 showing the lubricant in the condition in which it stands, under the influence of centrifugal force, when the machine element to which the lubricator is applied is in rotation.

In order that the centrifugal lubricator may attain the objects named, it has the following construction: In a cup-shaped holder *a*, which is screwed to the rotating machine element in the usual manner, is introduced a loosely-fitting reservoir *b*, filled with oil, and the holder *a* is then tightly closed by a cover *e*. In the position shown in Fig. 1 no oil reaches the oil-channel *d*. As soon as the machine element to which the lubricator is applied rotates with a given velocity the introduced reservoir *b*, which has a certain amount of play in the holder *a*, is moved outward under centrifugal force into the position shown in Fig. 2 and oil contained therein is forced against the cover *e* and is caused to flow through the openings *f* and reaches the oil-channel *d*.

Inasmuch as the lubricant in the position shown in Fig. 2 rarefies the air in the space *c*, it follows that as soon as the machine element comes to a standstill external atmospheric pressure exerted through the lubricating-channel *d* again returns the lubricant to the position shown in Fig. 1. Inasmuch as oil-feed increases with the number of revolutions of the machine element to which the lubricator is applied, while the machinery does not require oil in the same proportions, it is necessary to regulate the cross-section of the oil-passages to control the flow of oil. In order to accomplish this result, either the space between the inner diameter of the holder *a* and the external diameter of the reservoir *b* may be selected, or else a downwardly-movable cylindrical projection *g* may be suitably attached to the reservoir *b*, as shown in Figs. 3 and 4. This projection serves at the same time as a guide for the reservoir. The nearer the diameter of the projection on the reservoir approaches the inner diameter of the oil-passage the more the sectional area of the latter will be restricted and the less the oil will flow for a given number of revolutions of the machine element.

Having thus described my invention, the following is what I claim as new therein and desire to secure by Letters Patent:

1. A centrifugal lubricator comprising a suitable holder to be attached to a rotating machine element, having an attaching-shank with a bore opening into the holder, and a lubricant-reservoir in said holder, closing the bore when at its inward position, movable outwardly in the holder by centrifugal force to cause the lubricant to be automatically expelled, and of smaller dimensions than the holder so as to leave a space between it and the holder through which the lubricant escapes.

2. A centrifugal lubricator consisting of an outer shell closed against the admission of air and having means for securing it in a radial position on the rotating part and conducting lubricant thereto, and an inner shell movable radially in the outer shell, and loose therein so as to leave a lubricant-passage surrounding it.

3. A centrifugal lubricator comprising a tightly-closed holder adapted to be attached to a rotating machine element, and a cup-shaped lubricant-reservoir smaller in transverse dimensions than, and outwardly movable in, said holder, with its open end outward, leaving a passage for lubricant between the moving cup-shaped reservoir and the holder.

4. A centrifugal lubricator comprising a tightly-closed holder having an oil-passage formed in the bottom thereof, a cup-shaped lubricant-reservoir loosely fitted and outwardly movable in said holder, and a cylindrical body in the oil-passage for restricting the sectional area of the latter and removably attached to the cup whereby it may be replaced by others of different sizes for adapting the lubricator to machine elements rotating at different rates of speed.

5. A centrifugal lubricator comprising a holder having an oil-passage and adapted to be attached to a rotating machine element, and a cup-shaped oil-reservoir loosely fitted and outwardly movable in said holder and having a cylindrical projection entering the oil-passage of the holder, serving as a guide for the oil-reservoir.

The foregoing specification signed at Frankfort-on-the-Main this 24th day of November, 1900.

FRANZ SCHNEIDER.

Witnesses:
E. ZELLER,
JEAN GRUND,
CARL GRUND.